(12) United States Patent
Jakob et al.

(10) Patent No.: US 10,040,694 B2
(45) Date of Patent: *Aug. 7, 2018

(54) PRECIPITATED CALCIUM CARBONATE PARTICLES AND USE THEREOF

(71) Applicant: Imerys SA, Paris (FR)

(72) Inventors: Alexandra Jakob, Arles (FR); Christophe Guiton, Salin de Giraud (FR); Jean-Luc Rico, Salin de Giraud (FR)

(73) Assignee: Imerys SA, Paris (FR)

( * ) Notice: Subject to any disclaimer, the term of this patent is extended or adjusted under 35 U.S.C. 154(b) by 100 days.

This patent is subject to a terminal disclaimer.

(21) Appl. No.: 14/349,684

(22) PCT Filed: Oct. 4, 2012

(86) PCT No.: PCT/EP2012/069658
§ 371 (c)(1),
(2) Date: Apr. 4, 2014

(87) PCT Pub. No.: WO2013/050495
PCT Pub. Date: Apr. 11, 2013

(65) Prior Publication Data
US 2014/0242387 A1    Aug. 28, 2014

(30) Foreign Application Priority Data

Oct. 5, 2011 (EP) .................................. 11183924

(51) Int. Cl.
*C01F 11/18* (2006.01)
*C09C 1/02* (2006.01)
(Continued)

(52) U.S. Cl.
CPC .............. *C01F 11/18* (2013.01); *B82Y 30/00* (2013.01); *C01F 11/183* (2013.01); *C09C 1/021* (2013.01); *C09D 5/028* (2013.01); *C09D 7/42* (2018.01); *C09D 7/61* (2018.01); *C09D 7/62* (2018.01); *D21H 17/675* (2013.01);
(Continued)

(58) Field of Classification Search
None
See application file for complete search history.

(56) References Cited

U.S. PATENT DOCUMENTS

| 4,175,066 A | 11/1979 | Edagawa |
| 4,175,976 A * | 11/1979 | Avera ........................ B01J 2/28 106/217.7 |

(Continued)

FOREIGN PATENT DOCUMENTS

| CN | 1551855 A | 12/2004 |
| CN | 1697782 A | 11/2005 |

(Continued)

OTHER PUBLICATIONS

Search Report for Chinese Application No. 2016107393034, dated Sep. 14, 2017.

*Primary Examiner* — Ronak C Patel
(74) *Attorney, Agent, or Firm* — Finnegan, Henderson, Farabow, Garrett & Dunner LLP

(57) ABSTRACT

Use, as an opacifier, of precipitated calcium carbonate particles at least partially in the form of nano fibers or nanochain like agglomerates constituted by at least two interconnected primary particles.

14 Claims, 3 Drawing Sheets

Figure 1:
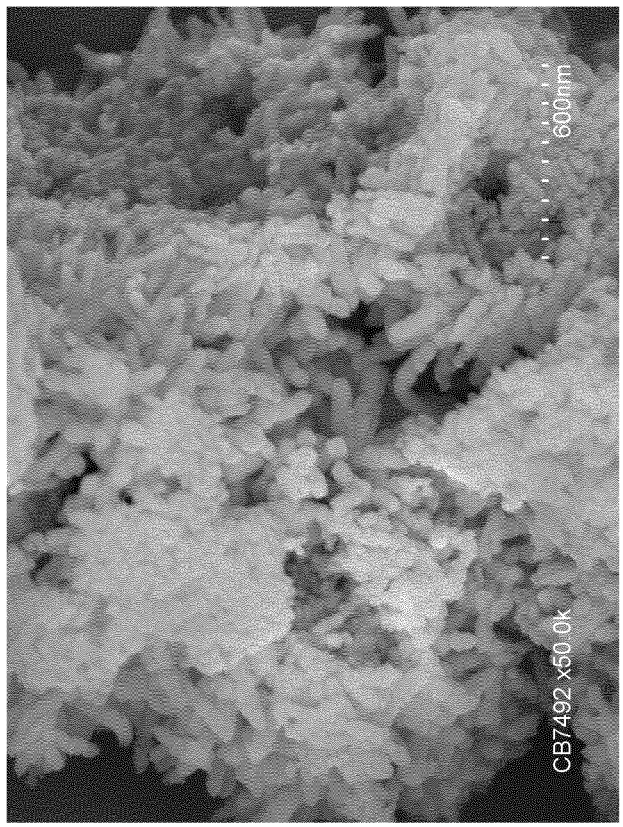

(51) Int. Cl.
  *D21H 19/38* (2006.01)
  *D21H 21/52* (2006.01)
  *C09D 5/02* (2006.01)
  *D21H 17/67* (2006.01)
  *B82Y 30/00* (2011.01)
  *C09D 7/42* (2018.01)
  *C09D 7/61* (2018.01)
  *C09D 7/62* (2018.01)

(52) U.S. Cl.
  CPC ........... *D21H 19/385* (2013.01); *D21H 21/52* (2013.01); *C01P 2004/03* (2013.01); *C01P 2004/16* (2013.01); *C01P 2004/45* (2013.01); *C01P 2004/54* (2013.01); *C01P 2004/61* (2013.01); *C01P 2004/62* (2013.01); *C01P 2004/64* (2013.01); *C01P 2006/12* (2013.01); *C01P 2006/60* (2013.01); *Y10T 428/2982* (2015.01)

(56) References Cited

U.S. PATENT DOCUMENTS

| | | | |
|---|---|---|---|
| 4,242,318 A | 12/1980 | Brahm et al. | |
| 4,367,207 A | 1/1983 | Vanderheiden | |
| 4,824,654 A | 4/1989 | Ota | |
| 5,007,964 A * | 4/1991 | Tsukisaka | B41M 5/3377 106/464 |
| 5,240,980 A | 8/1993 | Danielson et al. | |
| 5,672,201 A | 9/1997 | Simpson et al. | |
| 7,501,107 B2 | 3/2009 | Vogels et al. | |
| 2003/0213937 A1 | 11/2003 | Yaniv | |
| 2004/0166047 A1* | 8/2004 | Vogels | B82Y 30/00 423/432 |
| 2007/0287758 A1* | 12/2007 | Ricaud | B82Y 30/00 516/88 |
| 2008/0146715 A1* | 6/2008 | Yuan | C09C 1/021 524/425 |
| 2010/0163196 A1 | 7/2010 | Dougherty et al. | |

FOREIGN PATENT DOCUMENTS

| | | |
|---|---|---|
| CN | 101541682 A | 9/2009 |
| EP | 0000415 A1 | 1/1979 |
| EP | 0447094 A1 | 9/1991 |
| EP | 0634463 A2 | 1/1995 |
| EP | 0844213 A1 | 5/1998 |
| EP | 1925644 A2 | 5/2008 |
| EP | 2292701 A1 | 3/2011 |
| JP | 2004-533396 A | 11/2004 |
| JP | 2005-139320 A | 6/2005 |
| JP | 2006-096796 A | 4/2006 |
| JP | 2008-156204 A | 7/2008 |
| KR | 20040087050 A | 10/2004 |
| WO | 9820079 A1 | 5/1998 |
| WO | 03004414 A1 | 1/2003 |
| WO | WO 2004/108597 | 12/2004 |

\* cited by examiner

PRECIPITATED CALCIUM CARBONATE PARTICLES AND USE THEREOF

This application is a U.S. national phase entry under 35 U.S.C. § 371 of International Application No. PCT/EP2012/069658, filed on Oct. 4, 2012, which claims priority to European Application No. 11183924.7, filed on Oct. 5, 2011, the entirety of which is being incorporated herein by reference for all purposes.

The present invention relates to precipitated calcium carbonate particles in the form of nanofibers or chain like agglomerates and their use as an opacifier, especially in paint, plastic or paper industry. The present invention also relates to paints, papers and paper coatings comprising the same.

The use of calcium carbonate particles as a filler, for instance in papers and paints, is known in the art, including the use of precipitated calcium carbonate particles of specific shapes. For instance, U.S. Pat. No. 4,824,654 discloses a process of producing needle-shaped calcium carbonate particles which are useful as a filler or a reinforcing material of various materials such as rubbers, papers, plastics and paints. According to U.S. Pat. No. 4,824,654, the particles have an average length of 5-100 µm and an average diameter of 0.2-5 µm and may confer high smoothness and gloss to the material.

Another example is given by patent EP2292701 which discloses a process for preparing an aqueous suspension of dispersed calcium carbonate, wherein the resulting coating of said suspension provides opaque properties or has a specific light scattering coefficient S, such suspension comprising dispersed calcium carbonate and an alkali carbonate and/or alkali hydrogen carbonate and being especially suitable in the field of paper coatings, paper mass fillings, paints and plastic coatings.

When high opacity is sought, such as in paints which dry to give matt or silk (i.e. mid-sheen) finishes, zinc sulphide and, most often, titanium dioxide are used as opacifiers, as disclosed in EP0634463.

However, titanium dioxide has the disadvantage to be expensive. Furthermore, its typical industrial manufacturing processes are not environmentally friendly. There is thus a need for opacifiers having good opacifying properties but with a limited cost.

The purpose of the present invention is to provide an opacifier showing excellent opacifying properties while being of reasonable cost compared to known high quality opacifiers such as titanium dioxide.

The present invention therefore relates to the use, as an opacifier, of precipitated calcium carbonate particles being at least partially, preferably mostly, in the form of nano fibers or nanochain like agglomerates constituted by at least two interconnected primary particles.

Indeed, it has been surprisingly found that said calcium carbonate particles exhibit improved opacifying properties while keeping a mat finish, allowing the preparation of compositions showing an improved opacity of the composition itself and/or of the product obtained after curing or drying of said composition, compared to the use of other calcium carbonate grades. It is therefore possible to prepare compositions having an improved opacity with a mat finish. It is also possible to replace at least part of high quality opacifiers such as titanium dioxide, without decreasing the opacity of the composition and/or of the product obtained after curing or drying of said composition, which is of great economical interest for high performance paints. In particular in paints, the use of PCC according to the present invention might substitute up to 35 wt % of $TiO_2$ content without affecting opacity of the resulting composition.

In the present invention, the term "opacifier" intends to denote a substance that, when added to a material, renders it opaque or at least increases its opacity. Opacity is linked to the light scattering coefficient S and the light absorption coefficient K of the material, a higher S and/or a lower K corresponding to a higher opacity. Opacity is especially important in matte paints and papers.

The term "paint" intends to denote any liquid, liquefiable, or mastic composition, more particularly liquid or liquefiable composition, comprising pigments, which after application to a substrate in a thin layer is converted to an opaque solid film. Such a solid film is most commonly used to protect, color or provide texture to objects, for instance, walls.

The term "particle" is understood to mean a physically and chemically autonomous entity. The term "primary particle" refers to the elementary particles of precipitated calcium carbonate.

In the terms "nanofibers" and "nanochain like agglomerate", the prefix "nano" means that the nanofibers or nanochain like agglomerates have a characteristic dimension at the nanoscale, in particular a characteristic dimension which is, on average, less than 100 nm. In nanofibers or nanochain like agglomerates, said characteristic dimension is the average diameter.

The term "nanofiber" intends to denote an elongated entity having a characteristic dimension, i.e. average diameter, less than 100 nm. The term "nanochain like agglomerate" intends to denote an elongated entity having a characteristic dimension, i.e. average diameter, less than 100 nm. Nanofibers mainly differ from nanochain like agglomerates in that the individual primary particles cannot be distinguished anymore and form nanofibers which appear to be homogeneous and even, for example on electron microscopy photographs, whatever the magnification. In nanochain like agglomerates, the primary particles retain their individuality and remain visible, for example on electron microscopy. Nanochain like agglomerates can also be named "nanorosaries".

An essential feature of the present invention resides in the fact that at least part of the precipitated calcium carbonate particles are in the form of nano fibers or nanochain like agglomerates, such nano fibers or nanochain like agglomerates being constituted by at least two interconnected primary particles and therefore having an elongated morphology.

In the present invention, precipitated calcium carbonate particles are preferably present in the form of nanofibers or nanochain like agglomerates in an amount of at least 1% by weight of the calcium carbonate particles. Often, precipitated calcium carbonate particles are present in the form of nanofibers or nanochain like agglomerates in an amount of at least 8% by weight of the calcium carbonate particles. In the present invention, precipitated calcium carbonate particles are typically present in the form of nanofibers or nanochain like agglomerates in an amount of at least 10% by weight of the calcium carbonate particles, more preferably in an amount of at least 15% by weight of the calcium carbonate. The amount of nano fibers or nanochain like agglomerates has been evaluated relying on SEM (Scanning Electron Microscopy) or TEM (Transmission Electron Microscopy) image analysis. The obtained values correspond to the number of elementary particles that belongs to the nanofibers in respect to the total number of elementary nanoparticles, the measurement being performed in areas of acceptable resolution. It is preferred to determine the amount in a homogenized sample.

According to the invention, the primary particles are preferably in the form of calcite crystals. The primary particles may present in a huge variety of shapes, the most common being rhombohedral and scalenohedral morphology. Rhomboids are especially preferred.

In the present invention, without wishing to be committed to a theoretical explanation, it is believed that the nanofibers or the nanochain like agglomerates result from the end-to-end juxtaposition of primary particles that are approximately spherical. Therefore, the average primary particle size (dp) is close to the average diameter of the resulting nanofibers or nanochain like agglomerates. Advantageously, the average primary particle size (dp) differs from the average diameter of the nanofibers or of the nanochain like agglomerates by less than 50%, preferably by less than 25%, more preferably by less than 10%. These nanofibers or nanochain like agglomerates are thus secondary particles or agglomerates of primary particles. Said nanofibers or nanochain like agglomerates can optionally be further combined in any way. For instance, the nanofibers or nanochain like agglomerates may be interwoven with respect to one another in a disorganized way. The nanofibers or nanochain like agglomerates can also be combined parallel to one another and form "faggots" that may be composed of several tens or hundreds of similar nanofibers or nanochain like agglomerates. The nanofibers or nanochain like agglomerates can also be combined to form microshells. Microshells may be composed of tens to hundreds of nanofibers or nanochain like agglomerates. In such a case, the nanofibers or nanochain like agglomerates are usually visible at least on the inner part of the microshell like agglomerates. In the present invention, the nanofibers or nanochain like agglomerates are most of the time combined to form microshells.

The average diameter of the nano fibers or nanochain like agglomerates of the present invention can thus be estimated on the basis of the average primary particle size of the particles constituting the same (dp). As an approximation, it is considered that the average diameter of the nanofibers or nanochain like agglomerates is equal to the average primary particles size (dp). Said primary particle size (dp) is in general equal to or higher than 1 nm, in particular equal to or higher than 10 nm, more particularly equal to or higher than 20 nm, values equal to or higher than 30 nm giving good results. The primary particle size (dp) is usually equal to or lower than 100 nm, in many cases equal to or lower than 80 nm, values equal to or lower than 60 nm being common. Suitable ranges for the primary particle size (dp) of the nanofibers or nanochain like agglomerates are usually from 10 to 100 nm, preferably from 20 to 80 nm, more preferably from 30 to 60 nm. The primary particle size (dp) is typically measured by permeability (see Examples).

The average diameter of the nano fibers or nanochain like agglomerates of the present invention can also be estimated relying on SEM (Scanning Electron Microscopy) or TEM (Transmission Electron Microscopy) observations. For instance, the diameter of nano fibers can be determined by image analysis of pictures taken by scanning electron microscopy (SEM) or transmission electron microscopy (TEM), measuring directly the diameter of particles or measuring the breadth of rectangles comprising the particles, preferably measuring directly the diameter. The average diameter is the arithmetic mean of the individual diameters of the nanoparticles constituting a given population of nanoparticles. Said average diameter is in general equal to or higher than 1 nm, in particular equal to or higher than 10 nm, more particularly equal to or higher than 20 nm, values equal to or higher than 30 nm giving good results. The average diameter is usually equal to or lower than 100 nm, in many cases equal to or lower than 80 nm, values equal to or lower than 60 nm being common. Suitable ranges for the average diameter of the nanofibers or nanochain like agglomerates are usually from 10 to 100 nm, preferably from 20 to 80 nm, more preferably from 30 to 60 nm.

The average length of the nanofibers or nanochain like agglomerates can be estimated relying on SEM (Scanning Electron Microscopy) or TEM (Transmission Electron Microscopy) observations. For instance, the length of nano fibers can be determined by image analysis of pictures taken by scanning electron microscopy (SEM) or transmission electron microscopy (TEM), measuring directly the length of particles or measuring the length of rectangles comprising the particles, preferably measuring directly the length. The average length is the arithmetic mean of the individual lengths of the nanoparticles constituting a given population of nanoparticles. The nano fibers or nanochain like agglomerates typically result from end-to-end juxtaposition of from 2 to 20 primary calcium carbonate particles, preferably 2 to 10, most preferably 2 to 8. The average length of the nanofibers or nanochain like agglomerates typically ranges from 20 to 2000 nm, preferably from 40 to 800 nm, most preferably from 60 to 480 nm.

In the present invention, the nano fibers or nanochain like agglomerates may be at least partially combined in an organized or random way to form aggregates of nanofibers or of nanochains. In a specific embodiment, these nano fibers or nanochains may at least partially combine themselves to form microshell-like aggregates in which the nanofibers are at least partially, preferably mostly, visible on the inner part of the shell. The median size of these aggregates may be evaluated on the basis of the aggregate median size (D50) or Stoke's diameter, determined by sedimentation analysis (see Examples). Said aggregate median size (D50) is generally equal to or higher than 100 nm, especially equal to or higher than 200 nm, more specifically equal to or higher than 400 nm, for instance equal to or higher than 600 nm. The aggregate median size of the calcium carbonate particles of the present invention is typically equal to or lower than 5 µm, with preference equal to or lower than 3 µm, with higher preference equal to or lower than 2 µm, for example equal to or lower than 1.5 µm. Suitable ranges for the aggregate median size of the aggregates are from 0.1 to 5 µm, preferably from 0.2 to 3 µm, more preferably from 0.4 to 2 µm, most preferably from 0.6 to 1.5 µm.

In the present invention, it is advisable to limit the amount of aggregates having a size above 10 µm. The amount of agglomerates having a size above 10 µm is preferably less than 5% by weight of the calcium carbonate, typically less thank 2% by weight, especially less than 1% by weight. It has indeed been found that aggregates with a size above 10 µm can have a detrimental effect on the compositions comprising the same, especially resulting in a decrease of the composition opacity.

The nanofibers or the nanochain like agglomerates of the present invention have typically an aspect ratio strictly higher than 1.0. The aspect ratio is defined as the ratio of a "higher dimension" (L) of a particle, typically its length, on a "smaller dimension" of the particle, usually its diameter. The aspect ratio of the parties of the present invention is usually equal to or higher than 2, preferably equal to or higher than 3, for instance equal to or higher than 4. The aspect ratio of the nanofibers or the nanochain like agglomerates of the present invention is often equal to or lower than 50, more often equal to or lower than 20, values equal to or lower than 15 or equal to or lower than 10 giving good results. The aspect ratio is generally determined by image analysis of pictures taken by scanning electron microscopy (SEM) or transmission electron microscopy (TEM), these techniques being used to determine the lengths and diameters of the nanofibers or the nanochain like agglomerates. In the present invention, the aspect ratio of a population of nano fibers or the nanochain like agglomerates is the mean aspect ratio of a population of nano fibers or the nanochain like agglomerates, i.e. the arithmetic mean of the individual aspect ratios of the nano fibers or the nanochain like agglomerates constituting a given population of nanofibers or the nanochain like agglomerates. Suitable ranges for the aspect ratio varies from 2 to 50, especially from 3 to 20, more particularly from 4 to 15. Further suitable ranges for the aspect ratio varies from 5 to 50, especially from 2 to 20, more particularly 2 to 8.

In order to conduct image analysis of pictures taken by SEM or TEM, magnification should be chosen in a reasonable way, such that the particles would be reasonably defined and present in a sufficient number. In such conditions, the analysis of a reasonable number of pictures, for instance around 10 pictures, should allow accurate characterization of the particles. If magnification is too low, the number of particles would be too high and the resolution too low. If the magnification is too high, with for instance less than 10 particles per picture, the number of pictures to be analyzed would be too high and several hundreds of pictures should be analyzed to give accurate measurements. The method must therefore be chosen to provide a good dispersion degree of the nanoparticles into the sample.

Such calcium carbonate particles, in the form of nano fibers or nanochain like agglomerates, have generally an aggregation ratio, defined as the ratio of the aggregate median size (D50) on the average diameter (dp), higher than 1, preferably equal to or higher than 2, more preferably equal to or higher than 5, most preferably equal to or higher than 10, in particular equal to or higher than 20. The aggregation ratio of the particles is usually equal to or lower than 300, often equal to or lower than 100, most often equal to or lower than 50. An aggregation ratio from 5 to 300 is especially suitable, more particularly from 10 to 100, most particularly from 20 to 50.

Calcium carbonate particles used in the present invention generally have a $S_{BET}$ specific surface area higher than 20 $m^2/g$, especially from 20 to 50 $m^2/g$, in particular from 24 to 36 $m^2/g$. $S_{BET}$ specific surface area is measured by the BET technique described in Standard ISO 9277.

In a preferred embodiment, the precipitated calcium carbonate of the present invention comprises a crystallization controller. The expression "crystallization controller" is understood within the broad functional meaning. The function of the crystallization controller is to modify the interaction between the solid, liquid and gas phases present, during the nucleation and/or the growth of the crystalline seeds of calcium carbonate, so as to control the crystalline morphology obtained and thus the appearance of the resulting calcium carbonate particles. Crystallization controllers also play an important role to control the size of the precipitated calcium carbonate particles and may act as growth promoters or growth inhibitors.

In an especially preferred embodiment, the crystallization controller is selected from the group consisting of polyacrylic acid, salts thereof and mixtures thereof. Advantageously, the crystallization controller is selected from partially neutralized polyacrylic acid, especially polyacrylic acid wherein part of the acid groups has been neutralized with sodium ions. For instance, around 70% of the acid groups are neutralized, leading to a partially neutralized compound having a pH around 5-6. In another aspect, about 100% of the acid groups are neutralized, leading to a neutralized compound having a pH of about 6.5 to about 10.

In the present invention, the crystallization controller is usually present in an amount equal to or higher than from 0.1 wt % by weight of calcium carbonate, preferably equal to or higher than 0.2 wt %, more preferably equal to or higher than 0.25 wt %, for example equal to or higher than 0.5 wt %. The crystallization controller amount is typically equal to or lower than 10 wt % by weight of calcium carbonate, especially equal to or lower than 4 wt %, particularly equal to or lower than 2.5 wt %, more particularly lower than 2 wt %, values equal to or lower than 1 wt % being also suitable. Ranges of 0.1 to 10 wt % by weight of calcium carbonate are often used, more often from 0.2 to 4 wt %, for instance from 0.25 to 2.5 wt % or even from 0.25 to 1 wt %.

In the present invention, the crystallization controller has typically an average molecular weight from 500 to 15000 g/mol, often from 700 to 5000 g/mol, more often from 800 to 4000 g/mol, most often from 1000 to 3500 g/mol. The crystallization controller is usually added to the reaction medium prior to or during the calcium carbonate precipitation, typically as an aqueous solution.

The use according to the present invention is especially suitable in paints, paper mass fillings, paper coatings and plastic coatings, preferably in paints, paper mass fillings and paper coatings. The use of the present invention is especially advantageous in aqueous paints, particularly in matte or silk (i.e. mid-sheen) aqueous paints, more particularly in matte aqueous paints such as acrylic paints or "latex house paints", where high opacity is sought with a mat finish. The use of the present invention might also be of specific interest in paper fillings and paper coatings such as in cigarette papers or rolling papers.

The use according to the present invention is therefore typically applied to improve opacity of paints, papers, paper coatings or plastic coatings, preferably of paints, papers and paper coatings, more preferably of paints. The use according to the present invention can also be applied to decrease the cost of a composition without decreasing its opacity and/or the opacity of the product obtained after curing or drying of said composition.

The precipitated calcium carbonate particles used in the present invention are typically prepared by carbonation of milk of lime in the presence of a crystallization controller selected from polyacrylic acid, salts thereof and mixtures thereof. For instance, the precipitated calcium carbonate particles used in the present invention might be prepared according to the process of International Patent Application WO03/004414 which is enclosed herewith by reference in its entirety, and more particularly page 2, line 11 to page 3, line 38; page 4, line 29 to page 5, line 6; and page 5, line 36 to page 6, line 28; as well as examples 4 and 5.

In the preparation process, the concentration of calcium hydroxide in the milk of lime can have a value of 0.3 to 30% by weight of the milk of lime. Advantageously, this concentration has a value of at least 1 wt %, especially equal to or higher than 2 wt %, for instance equal to or higher than 2.5 wt %. It is recommended that the concentration of calcium hydroxide in the milk of lime does not exceed 25 wt %, in particular equal to or lower than 20 wt %, values equal to or lower than 15 wt % being especially suitable. For instance, the concentration of calcium hydroxide in the milk of lime might be in a low range such as from 2 to 5 wt %, or in higher range such as from 10 to 15 wt %.

In said preparation process, the temperature may vary from 0 to 80° C., especially from 10 to 60° C. Usually, the temperature at the beginning of carbonation is equal to or higher than 10° C., in particular equal to or higher than 12° C. The temperature at the beginning of carbonation is often equal to or lower than 25° C., most often equal to or lower than 20° C. Temperature at the beginning of carbonation might for instance be around 15° C. Temperature at the end of carbonation might be higher, typically from 10 to 80° C., for instance from 15 to 60° C.

In the preparation process, milk of lime is carbonated by reaction of the latter with carbon dioxide gas. Carbon dioxide gas having a concentration of carbon dioxide varying from 3 to 100% could be used with success. However, it is preferable to use carbon dioxide gas for which the concentration is from 10 to 60%, especially from 25 to 40%, carbon dioxide gas being diluted with air.

Some additives might also be further added during the carbonation step, such as isoascorbic acid, to reduce yellowness of the resulting calcium carbonate particles.

Said preparation process typically leads to a precipitated calcium carbonate slurry comprising for instance 3 to 20 wt % PCC by weight of slurry.

The precipitated calcium carbonate particles might then be filtered, for example through a planar filter, and dried, for instance in an oven, by spraying into a stream of hot air (spray drying), or by the action of radiation such as infrared radiation (epiradiator), preferably in an oven or by the action of radiation such as infrared radiation. The resulting particles might then be further milled, for instance in a pin mill apparatus with a milling intensity ranging from 10 000 rpm to 20 000 rpm.

In some cases, it may be advantageous to further coat the particles with a layer of organic matter such as saturated or unsaturated fatty acids having 2 to 22 carbon atoms, fatty acids with chains from 16 to 18 carbon atoms being preferred. Such a coating of the particles is especially suitable for their subsequent use in plastics. In paint and paper applications, the particles are usually not coated with a layer of organic matter.

In a further embodiment, the present invention relates to precipitated calcium carbonate particles, useful as an opacifier, comprising a crystallization controller selected from polyacrylic acid, salts thereof and mixtures thereof and being in the form of nanofibers or nanochain like agglomerates constituted by at least two interconnected primary particles.

More particularly, the present invention also relates to specific precipitated calcium carbonate particles comprising from 0.1 to less than 2 wt % of a crystallization controller selected from polyacrylic acid, salts thereof and mixtures thereof and being in the form of nanofibers or nanochain like agglomerates constituted by at least two interconnected primary particles, preferably by 2 to 8 primary particles, wherein the nano fibers or nanochain like agglomerates have an average diameter from 30 to 60 nm, an average length from 60 to 480 nm and an aggregate median size of 0.6 to 1.5 µm.

In a still further embodiment, the present invention relates to the use of such specific precipitated calcium carbonate particles as a filler, preferably as an opacifier. Advantageously, such specific precipitated calcium carbonate particles are used as an opacifier in paint, plastic, or paper industry, especially in paints, paper mass fillings and paper coatings, more particularly in aqueous paints such as in matte or silk (i.e. mid-sheen) aqueous paints, most particularly in matte aqueous paints such as acrylic paints or "latex house paints", where high opacity is sought with a mat finish. The use of said specific precipitated calcium carbonate particles might also be of interest in paper fillings and paper coatings such as in cigarette papers or rolling papers. In a particular further embodiment, the specific precipitated calcium carbonate particles are used as a functional additive. Such functional additive can bring some additional properties to the target object, being such as adequate rheology characteristics for different applications. Advantageously, such specific precipitated calcium carbonate particles are used as a functional additive in plastisol, sealant or ink.

In view of the above, the present invention also relates to paint, paper, or paper coating, preferably paint, comprising precipitated calcium carbonate particles in the form of nano fibers or nanochain like agglomerates constituted by at least two interconnected primary particles. Advantageously, the paint, paper, or paper coating, preferably paint, comprises precipitated calcium carbonate particles comprising a crystallization controller selected from polyacrylic acid, salts thereof and mixtures thereof, more particularly in an amount from 0.1 to less than 2 wt %, the particles being in the form of nanofibers or nanochain like agglomerates constituted by at least two interconnected primary particles. In a further particular embodiment, the precipitated calcium carbonate particles comprise a crystallization controller, especially selected from polyacrylic acid, salts thereof and mixtures thereof, and more particularly in an amount from 0.1 to less than 2 wt %, and are in the form of nanofibers or nanochain like agglomerates constituted by at least two interconnected primary particles, wherein the nanofibers or nanochain like agglomerates have an average diameter from 30 to 60 nm, an average length from 60 to 480 nm and an aggregate median size (D50) of 0.6 to 1.5 µm. In a still further embodiment, the paints of the present invention comprise a higher amount of precipitated calcium carbonate of the present invention than of other opacifiers, in particular a higher amount of precipitated calcium carbonate of the present invention than of $TiO_2$.

The present invention further relates to objects coated with the paint of the present invention, especially walls coated with the paint of the present invention.

The specific and preferred technical features as disclosed above also applies to all these embodiment.

SHORT DESCRIPTION OF THE FIGURES

FIG. 1: electron microscopy photograph (SEM) of nanochain like calcium carbonate particles prepared according to Example 6.

Figure 2:
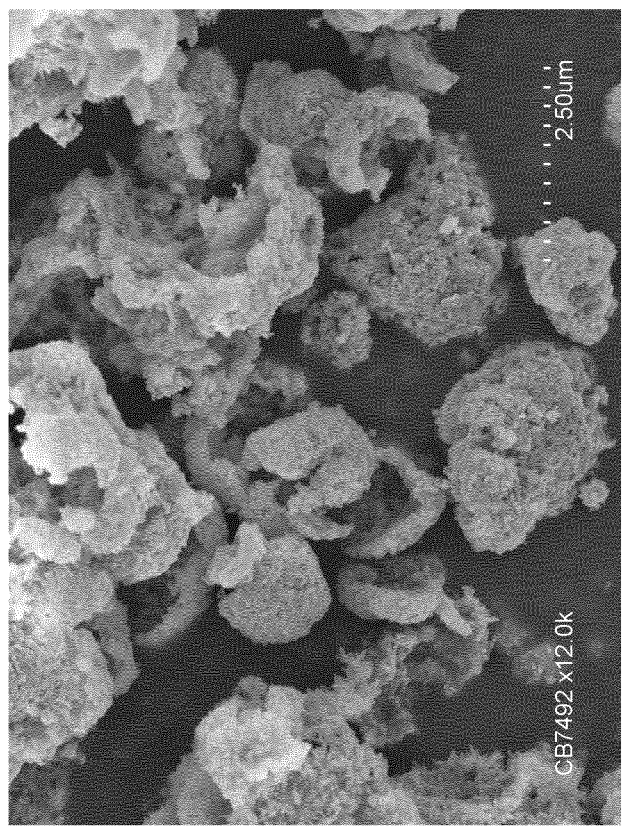

FIG. 2: electron microscopy photograph (SEM) of microshell like aggregates resulting from nanofibres/nanochains agglomeration, prepared according to Example 6.

Figure 3:
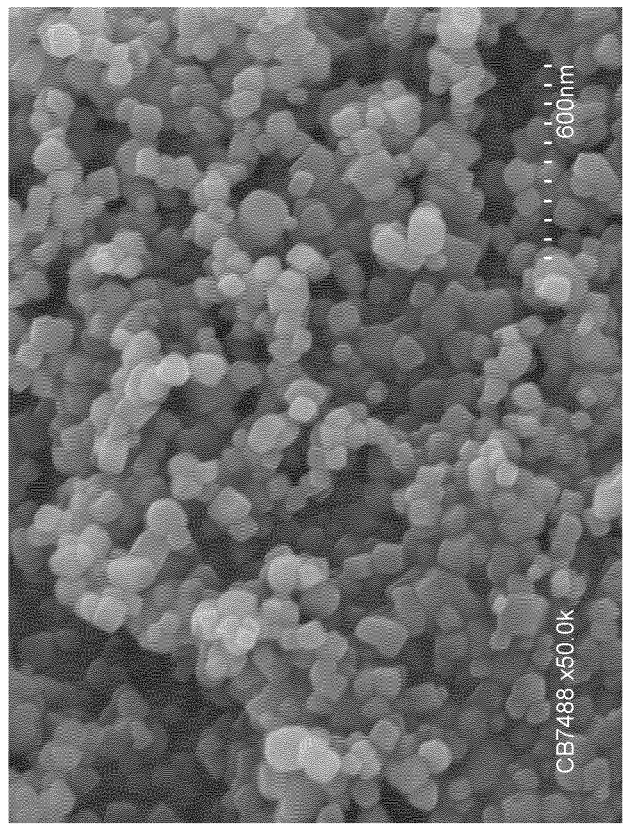

FIG. 3: electron microscopy photograph (SEM) of rhomboid calcium carbonate prepared in conditions similar to Example 1 but in the absence of polyacrylate.

The present invention is further illustrated below without limiting the scope thereto.

Should the disclosure of any patents, patent applications, and publications which are incorporated herein by reference conflict with the description of the present application to the extent that it might render a term unclear, the present description shall take precedence.

EXAMPLES

Precipitated Calcium Carbonate (PCC) Particles Characterization Average Primary Particle Size (dp)

dp was determined by permeability measured according to a method derived from BS 4359-2. The basis of this method is the measurement of the air permeability of a pellet, which is analogous to the "Blaine" or the "Lea & Nurse method". The calculation of the dp derives from the Carman & Malherbe formula:

$$q \times L = \frac{1.05\varepsilon^2}{(1-\varepsilon)^2}ds^2 + \frac{2.88\varepsilon^3}{1-\varepsilon}ds$$

with $$\varepsilon = 1 - \frac{W}{A \times L \times D}$$

It can be shown that the mean particle diameter ds which is determined according to the Carman & Malherbe formula is not absolutely independent from the porosity of the pellet. Consequently, a correction was brought considering the reference porosity ε=0.45 and the dp was calculated according to the formula:

$$dp = ds \times e^{-3.2(\varepsilon - 0.45)}$$

Definitions and unities are as follows:
q=volumetric rate of air flow passed through the PCC pellet ($cm^3/g$),
ε=porosity,
W=weight of PCC,
L=thickness of the pellet,
D=density of PCC ($g/cm^3$),
A=area of the cross section of the pellet ($cm^2$),
ds=mean particle diameter according to Carman & Malherbe (μm), and
dp=mean particle diameter according to Solvay (μm).

Average Diameter and Average Length

Average diameter and average length of the nanofibers or nanochain like agglomerates was estimated relying on scanning electron microscope (SEM) observations. The samples were prepared from a metallized powder and observed with a Hitachi S-4800 SEM. The samples were directly placed on a graphite tape, then metallized with platinum for 1 minute under a vacuum of $10^{-1}$ Pa with a beam intensity of 6 mA.

Aggregate Median Size (D50 or Stoke's Diameter)

D50 was measured on the basis of French standard ISO 13317-3, "Particle size sedimentation analysis of a powder by variable height gravity in a liquid. Method by X-ray absorption measurement", in which the general method and the apparatus (Sedigraph) are described. Preparation of the sample influencing the results of the measurement, such preparation method is described below.

Preparation of the samples: 2.7 g of precipitated calcium carbonate were introduced into 50 ml of Na-hexametaphosphate (2 g/L) and the solution was treated by magnetical stirring and ultrasound.

For the measurements, a Sedigraph 5100® equipped with an automatic sampler Mastertech 51® from Micromeritics was used. The measurement was performed between 0.1 μm (starting diameter) and 100 μm (ending diameter).

General Procedure for the Preparation of Aqueous Emulsion Paints

The two following formulations were prepared.

|  | Formulation 1 (wt %) | Formulation 2 (wt %) |
| --- | --- | --- |
| Demineralized water | 28.2 | 31.1 |
| TiO$_2$ | 5.0 | 6.0 |
| GCC* | 38.0 | 36 to 44 |
| PCC | 15.0 | 6 to 14 |
| Biocide | 0.2 | 0.2 |
| Defoamer | 0.2 | 0.2 |
| Binder | 12.0 | 11.0 |
| Dispersing agent: sodium hexametaphosphate | 0.5 | 0.5 |
| Wetting agent: ammonia polyacrylate | 0.3 | 0.5 |
| Rheological additive: cellulose | 0.4 | 0.4 |
| Ammonia | 0.2 | 0.5 |

*Ground calcium carbonate

Cellulose was added to the water with stirring. Ammonia was added and the mixture was stirred again and then allowed to swell for approximately 20 minutes with repeated stirring. The wetting agent, the dispersing agent and the defoamer were then added, followed by GCC, PCC and TiO$_2$. The composition was transferred into a dissolver and was dispersed during approximately 5 minutes at 2500±500 Rpm, then the binder and the biocide were added and the mixture was further dispersed for approximately 2 minutes at 2000±500 Rpm. The paint was allowed to stand for one day at room temperature before testing.

The resulting aqueous emulsion paints were characterized as follows, according to EN-13300 standards.

Optical Properties

Paint test cards were prepared using an automatic coater (Erichsen, Typ 509 MC) to coat contrast test cards (Leneta Form 09) with the paint samples to be tested, at a feed rate of 7.5 mm/s (layer of 200 μm). Films were then left to dry before measurements.

Optical properties were measured using a spectrophotometer (DataColor DC 600 and Datacolor QCX software), calibrated with a black standard (luminance factor 0.1%) and a white calibration standard (serial No. 12077) before each measuring cycle. This gave the following results: brightness (Y, DIN 53163), yellowness (DIN 6167) and opacity. Opacity corresponds to the contrast ratio which is the ratio $Y_{black}/Y_{white} \times 100$, where $Y_{black}$ and $Y_{white}$ are the brightness on respective black and white parts of the contrast test cards.

Gloss was measured with a gloss measuring equipment such as micro-TRI-gloss from Byk-Gardner. Same cards were used as those used to measure the optical properties. The gloss was measured at an angle of 85° for at least three different positions on the sample surface. Gloss values are given in GU (Gloss Unit).

Absrasivity

Abrasivity was measured on the basis of standard ISO 11998. Wet abrasion was measured as the loss of layer thickness (μm) by scrubbing with a scrub cloth in defined cycles (200 cycles).

Example 1

Preparation of Precipitated Calcium Carbonate (PCC)

A milk of lime with a concentration of 5% wt. Ca(OH)$_2$ and an initial temperature of 14.2° C. was enriched with 2 wt (percentage related to the final CaCO$_3$ produced) of partially neutralized polyacrylic acid (molecular weight of 2500 g/mol, 70% of acid groups are neutralized with sodium ions, pH 5-6). The carbonation occurred under a 40% CO$_2$ flow (diluted with air) at a flow rate of 12.5 m³/h. The final carbonation temperature was 15.5° C. The resulting precipitated calcium carbonate was filtered on a planar filter and was dried in an oven for 36 h at 95° C., before milling in an Alpine 160 Z at 10 000 rpm.

The obtained product was constituted of nanochain like agglomerates, combined to form microshell like aggregates. Average primary particle size (dp) was 36 nm and average aggregate median size (D50) was 0.85 µm in the PCC suspension after carbonation. Average diameter and average length as determined by image analysis of SEM pictures were respectively 41 nm and 180 nm. These values are based on the measurement of 20 nanofibers.

Example 2 and Comparative Example 1

PCC prepared in Example 1 was tested into Formulation 1 and compared to a standard PCC grade, i.e. Socal® P3.

The results are summarized in Table 1 below.

TABLE 1

|  | Ex. 2 | Comp. Ex. 1 |
| --- | --- | --- |
| PCC | PCC of Ex. 1 | Socal P3 |
| Optical data, wet | | |
| Brightness (%) | 85.8 | 86.4 |
| Opacity (%) | 97.19 | 96.61 |
| Yellowness | 1.4 | 1.4 |
| Optical data, dry | | |
| Brightness (%) | 94.5 | 93.5 |
| Opacity (%) | 99.03 | 97.94 |
| Yellowness | 1.4 | 1.3 |
| Gloss (GU) | 6.5 | 6.0 |
| Abrasivity | | |
| Abrasivity (µm) | 10 | 7 |

It can be seen from Table 1 that an opacity increase of approximately 1% was obtained with the PCC of Example 1, while all the other properties remained compatible with a use in an application such as matte aqueous paints. Such an increase of 1% opacity is significant.

Examples 3-5 and Comparative Examples 2-4

PCC prepared in Example 1 was tested into Formulations 2 comprising respectively 6, 10 and 14 wt % of PCC, and compared to a standard PCC grade, i.e. Socal® P3.

The results are summarized in Table 2 below.

TABLE 2

|  | Ex. 3 | Comp. Ex. 2 | Ex. 4 | Comp. Ex. 3 | Ex. 5 | Comp. Ex. 4 |
| --- | --- | --- | --- | --- | --- | --- |
| PCC | PCC of Ex. 1 | Socal® P3 | PCC of Ex. 1 | Socal® P3 | PCC of Ex. 1 | Socal® P3 |
| PCC amount (%) | 6 | 6 | 10 | 10 | 14 | 14 |
| Optical data, dry | | | | | | |
| Brightness (%) | 92.7 | 91.9 | 93.3 | 92.5 | 94.0 | 93.0 |
| Opacity (%) | 98.2 | 97.2 | 98.8 | 97.7 | 98.9 | 97.9 |
| Yellowness | 2.0 | 2.1 | 1.7 | 1.9 | 1.6 | 1.8 |
| Gloss (GU) | 4.0 | 3.7 | 5.3 | 4.2 | 7.4 | 4.9 |
| Abrasivity | | | | | | |
| Abrasivity (µm) | 8 | 17 | 8 | 15 | 9 | 12 |

It can be seen from Table 2 that, for the various PCC contents tested, the opacity obtained with the PCC according to the present invention was at least 1% higher than the opacity obtained with PCC of the prior art. All the other properties remained compatible with a use in an application such as matte aqueous paints.

Example 6

Preparation of Precipitated Calcium Carbonate (PCC)

A milk of lime with a concentration of 14.6% wt. $Ca(OH)_2$ and an initial temperature of 12.7° C. was enriched with 0.5 wt % (percentage related to the final $CaCO_3$ produced) of partially neutralized polyacrylic acid (molecular weight of 2500 g/mol). The carbonation occurred under a 40% $CO_2$ flow (diluted with air) at a flow rate of 12.5 m³/h. The final carbonation temperature was 40.1° C. The resulting precipitated calcium carbonate was filtered on a planar filter and was dried in an oven for 36 h at 95° C.

The obtained product was constituted of nanochain like agglomerates, combined to form microshell like aggregates. This is illustrated in FIGS. 1 and 2. Average primary particle size (dp) was 42 nm and the average aggregate median size (D50) was 1.32 µm in the PCC suspension after carbonation, before milling in an Alpine 160 Z at 14 800 rpm. Average diameter and average length as determined by image analysis of SEM pictures were respectively 49 nm and 193 nm. These values are based on the measurement of 20 nanofibers.

Example 7 and Comparative Example 5

PCC prepared in Example 6 was tested into Formulation 1 and compared to a standard PCC grade, i.e. Socal® P3.

The results are summarized in Table 3 below.

TABLE 3

|  | Ex. 7 | Comp. Ex. 5 |
| --- | --- | --- |
| PCC | PCC of Ex. 6 | Socal® P3 |
| Optical data, wet | | |
| Brightness (%) | 86.6 | 86.4 |
| Opacity (%) | 96.5 | 96.6 |
| Yellowness | 1.5 | 1.4 |
| Optical data, dry | | |
| Brightness (%) | 94.0 | 93.5 |
| Opacity (%) | 98.6 | 97.9 |
| Yellowness | 1.3 | 1.3 |
| Gloss (GU) | 6.0 | 6.0 |
| Abrasivity | | |
| Abrasivity (µm) | 13 | 7 |

It can be seen from Table 3 that an opacity increase was obtained with the PCC of Example 6, while all the other properties remained compatible with a use in an application such as matte aqueous paints.

Examples 8-10 and Comparative Examples 6-8

PCC prepared in Example 6 was further tested into Formulations 2 comprising respectively 6, 10 and 14 wt % of PCC, and compared to a standard PCC grade, i.e. Socal® P3.

The results are summarized in Table 4 below.

TABLE 4

|  | Ex. 8 | Comp. Ex. 6 | Ex. 9 | Comp. Ex. 7 | Ex. 10 | Comp. Ex. 8 |
|---|---|---|---|---|---|---|
| PCC | PCC of Ex. 6 | Socal® P3 | PCC of Ex. 6 | Socal® P3 | PCC of Ex. 6 | Socal® P3 |
| PCC amount (%) | 6 | 6 | 10 | 10 | 14 | 14 |
| Optical data, dry | | | | | | |
| Brightness (%) | 92.7 | 91.9 | 93.5 | 92.5 | 93.9 | 93.0 |
| Opacity (%) | 98.3 | 97.2 | 98.5 | 97.7 | 98.9 | 97.9 |
| Yellowness | 2.1 | 2.1 | 1.9 | 1.9 | 1.8 | 1.8 |
| Gloss (GU) | 4.6 | 3.7 | 5.8 | 4.2 | 7.4 | 4.9 |
| Abrasivity | | | | | | |
| Abrasivity (μm) | 12 | 17 | 13 | 15 | 12 | 12 |

It can be seen from Table 4 that, for the various PCC contents tested, the opacity obtained with the PCC according to the present invention was increased. All the other properties remained compatible with a use in an application such as matte aqueous paints.

The invention claimed is:

1. An opacifier comprising
   precipitated calcium carbonate particles present in the form of nanofibers or nanochain like agglomerates,
   wherein the nanofibers or nanochain like agglomerates are at least partially combined in the form of microshell like aggregates and are constituted by at least two interconnected primary particles and visible at least on the inner part of the microshell.

2. The opacifier according to claim 1, wherein the opacifier is in a paint, paper mass filling, paper coating or plastic coating.

3. The opacifier according to claim 1, wherein the opacifier is in an aqueous paint.

4. The opacifier according to claim 1, wherein the opacifier improves the opacity of a paint, paper, paper coating or plastic coating.

5. The opacifier according to claim 1, wherein the precipitated calcium carbonate particles comprise a crystallization controller.

6. The opacifier according to claim 5, wherein the precipitated calcium carbonate particles comprise from 0.1 to 10 wt % of crystallization controller by weight of calcium carbonate.

7. The opacifier according to claim 5, wherein the crystallization controller has an average molecular weight from 500 to 15000 g/mol.

8. The opacifier according to claim 1, wherein the nanofibers or nanochain-like agglomerates have an average diameter from 10 to 100 nm and wherein the nanofibers or nanochain-like agglomerates have an average length from 20 to 2000 nm.

9. The opacifier according to claim 1, wherein the nanofibers or nanochain-like agglomerates result from the end-to-end juxtaposition of calcite crystals.

10. The opacifier according to claim 9, wherein the calcite crystals are in the shape of rhomboids.

11. The opacifier according to claim 1, wherein the nanofibers or nanochain-like agglomerates result from the end-to-end juxtaposition of 2 to 20 primary calcium carbonate primary particles.

12. The opacifier according to claim 11, wherein the nanofibers or nanochain-like agglomerates result from the end-to-end juxtaposition of 2 to 10 primary calcium carbonate primary particles.

13. The opacifier according to claim 1, wherein the microshell-like aggregates have an aggregate median size (D50) from 0.1 to 5 μm.

14. The opacifier according to claim 1, wherein the microshell-like aggregates have an aggregate median size (D50) from 0.2 to 3 μm.

* * * * *